United States Patent [19]

Kossiakoff et al.

[11] 3,946,382
[45] Mar. 23, 1976

[54] SEARCH RADAR ADAPTIVE VIDEO PROCESSOR

[75] Inventors: Alexander Kossiakoff, Brookville; James R. Austin, Gaithersburg, both of Md.

[73] Assignee: The United States of America as represented by the Secretary of the Navy, Washington, D.C.

[22] Filed: Oct. 27, 1972

[21] Appl. No.: 302,609

Related U.S. Application Data

[63] Continuation-in-part of Ser. No. 12,541, Jan. 28, 1970, abandoned.

[52] U.S. Cl. .......................... 343/5 DP; 343/17.1 R
[51] Int. Cl.² ...................... G01S 7/30; G01S 9/02
[58] Field of Search ...................... 343/5 DP, 17.1 R

[56] References Cited
UNITED STATES PATENTS

| | | |
|---|---|---|
| 2,842,761 | 7/1958 | Downs .................. 343/17.1 R X |
| 3,149,333 | 9/1964 | Campbell .................. 343/17.1 R |
| 3,162,852 | 12/1964 | Altovsky et al. .............. 343/17.1 R |
| 3,438,034 | 4/1969 | Carre et al. .................. 343/17.1 R |
| 3,531,802 | 9/1970 | Brown et al. .................. 343/17.1 R |
| 3,701,149 | 10/1972 | Patton et al. .................. 343/5 DP |

Primary Examiner—Malcolm F. Hubler

[57] ABSTRACT

A method and apparatus for the resolution of targets in the presence of such distributed clutter as sea waves, rain, land, clouds and chaff. More specifically, real air targets in the proximity with this type of clutter are detected by deriving an adaptive threshold against which all radar video signals are compared. The design of the instant invention is based on a statistical knowledge of the temporal and spatial characteristics of distributed clutter so that only the magnitude of the clutter in the immediate vicinity of the target need be measured.

14 Claims, 5 Drawing Figures

SEARCH RADAR ADAPTIVE VIDEO PROCESSOR

RELATED APPLICATION

The present application is a continuation-in-part of our earlier application, Ser. No. 12,541 filed Jan. 28, 1970, now abandoned.

BACKGROUND OF THE INVENTION

The present invention generally relates to radar processing and more specifically to a method and apparatus for detecting target images in the presence of clutter. Radar reflections from waves, land, rain, clouds and chaff inherently degrade the ability of three-dimensional search radar to detect targets. When targets are actually within the clutter area, the target echo is submerged in the noiselike clutter return. When targets are either above or below areas of clutter, the return from the clutter is superimposed on the target returns on a plan position indicator radar display. Even when targets are in a different sector from clutter areas, the operator's attention tends to be distracted by the clutter which he must continually examine for emergence of targets. Automatic detection devices have been generally unsuccessful because of saturation by false targets from clutter.

BRIEF SUMMARY OF THE INVENTION

The purpose of the present invention is to provide a means of preserving the inherent detection capabilities of three-dimensional search radars when operating in the presence of distributed clutter such as that produced by rain, clouds, chaff, land and sea surfaces. It is also the purpose of this invention to provide a signal which is suitable for application to a digital computer to achieve automatic detection and tracking of radar targets by suppressing false alarms which are ordinarily produced by distributed clutter while simultaneously maintaining optimum sensitivity for discrete targets.

The effective suppression of these types of clutter requires that radar detection be made before the radar video is collapsed in elevation for purposes of display. Furthermore, since the magnitude of clutter may vary rapidly as a function of range and elevation, a means is provided to measure the background clutter magnitude and use it to establish an adaptive threshold which eliminates false alarms while simultaneously permitting the detection of targets. In this way, the detection of targets which are not embedded in clutter is not degraded by the clutter which may be in the general vicinity. Also, localized clutter such as that produced by rain will not be mistaken for a target and thereby be erroneously reported thus creating a false alarm. Therefore, clutter at a given range and bearing will be eliminated, thus preserving radar visibility for targets at the same range and bearing as the clutter but at a different elevation which provides for inherent three-dimensional operation.

Since the statistical properties of distributed clutter are well-known, it is possible to use this knowledge in the design of a system to generate a threshold signal for each radar cell which eliminates clutter but which preserves detection capability for targets which present a sufficiently large signal-to-noise ratio. That is, it is not necessary to blank the radar output whenever clutter is encountered which thus precludes detection of targets irrespective of their size. Rather, detection sensitivity is reduced only as much as is necessary to retain the required false alarm rate which is a function of the radar application.

It is therefore an object of this invention to provide an adaptive radar video processor capable of detecting targets in the presence of distributed clutter.

It is another object of this invention to provide a video processor that will preserve the inherent detection capabilities of three-dimensional search radars.

It is yet another object of this invention to provide a video processor which exhibits an adaptive threshold for ascertaining the presence of targets thereto.

Still another object of this invention is to provide a video processor which measures clutter magnitude only in the immediate vicinity of the target.

These and other objects of the invention, as well as many of the attendant advantages thereof, will become more readily apparent when reference is made to the following description, taken in conjunction with the accompanying drawings wherein.

Figure 1:
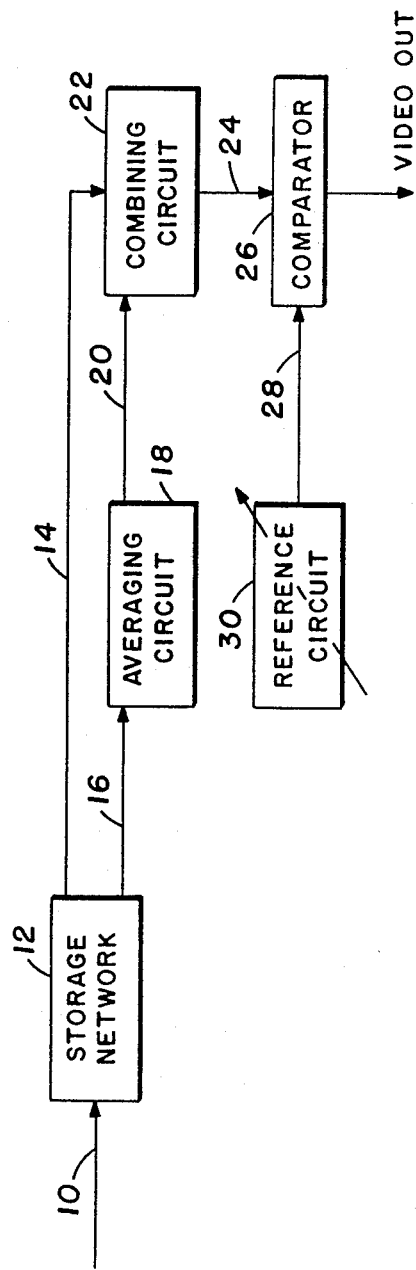
FIG. 1 is a simplified block diagram illustrating the basic elements of the proposed video processing system of the present invention.

Referring now to FIG. 1, there is shown a basic embodiment of the instant invention. The input signal 10 from the host radar (not shown) is supplied to a storage network 12 in values appropriately corresponding to the radar returns from a group of range cells. These range cell values are then subdivided, by the storage network 12, into the particular range cell of interest which is accessed at 14 and the surrounding range cells which are accessed at 16. The video signals for the range cells surrounding the cell of interest 14 (hereinafter also referred to as the center tap cell) are then applied to the averaging circuit 18, wherein such video signals are first summed and then divided by the number of surrounding cells, so as to produce a mean clutter value at 20. This mean clutter value 20 is then combined with said cell of interest 14 in combining circuit 22, in a manner to be described in detail hereinafter, in order to produce an output signal at 24 representing the mean signal-to-clutter ratio. In the comparator circuit 26 said signal-to-clutter ratio 24 is compared with a reference signal 28 as produced by variable reference circuit 30 whereupon if said signal-to-clutter ratio 24 exceeds the value of the reference signal 28, an output video pulse signal is produced which is indicative of target presence.

More specifically, in FIG. 1, the video signal 10 from the host radar is applied to the storage network 12 which holds the returns from a number of range cells that are defined to be equal to the reciprocal of the radar bandwidth. At each time interval corresponding to a radar range cell, the oldest video signal is discarded and a new video signal is stored.

Figure 3:
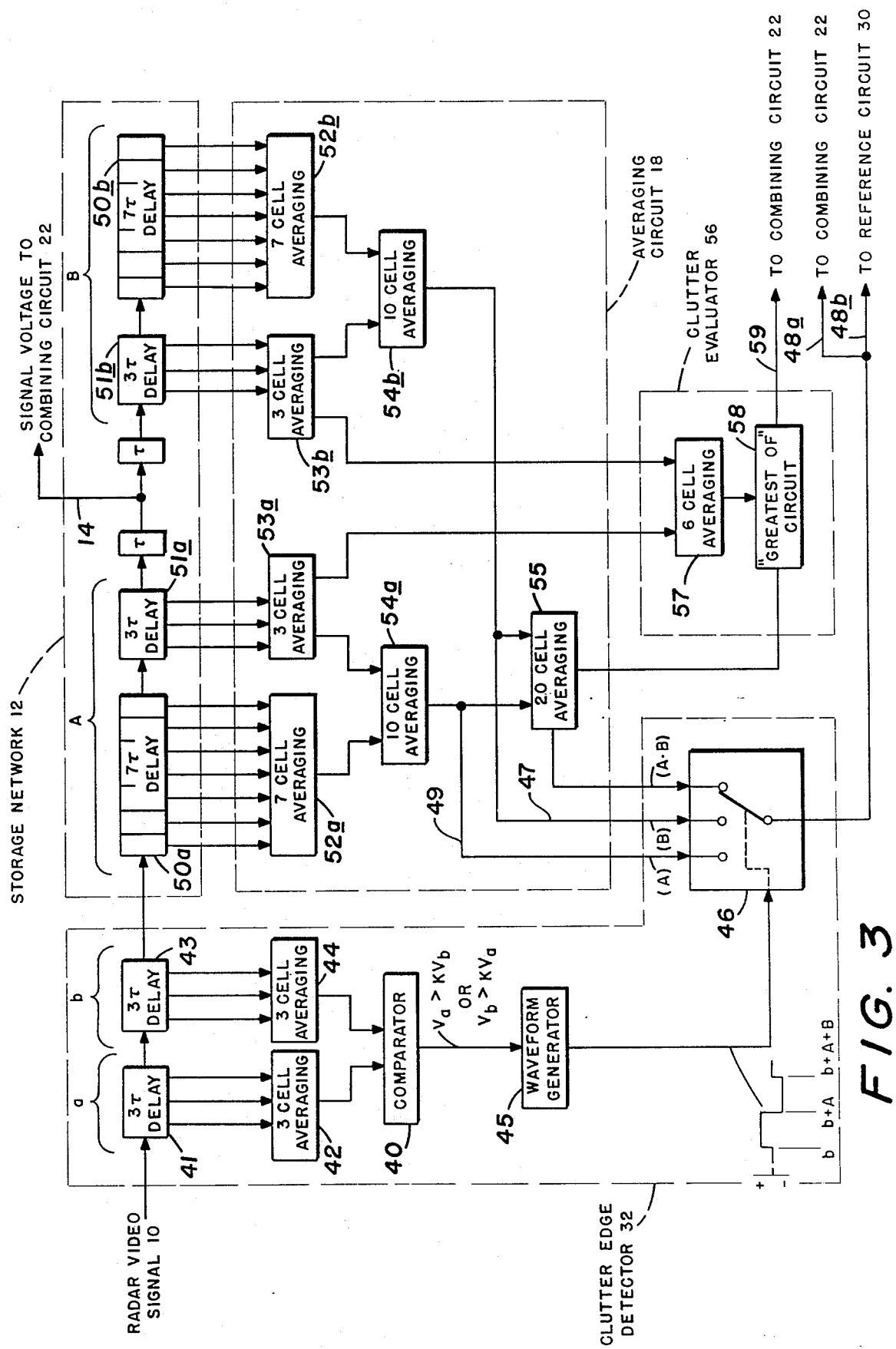
FIG. 3 is a block diagram illustrating in more detail the embodiment of FIG. 2.

In one practical application of the proposed adaptive video processor and in the illustrated embodiment of FIG. 3, a tapped video delay line is utilized as the storage network 12. Obviously, however, other forms of signal storage could be employed. For example, the video signal may be sampled at a rate determined by the reciprocal of the radar bandwidth and then coverted to digital form. In this case, the storage medium would be either a core memory or other similar electronic device. For purposes of description, only the analog confiuration will be discussed.

Assuming, therefore, that a video delay line is used as the storage network 12, at any instant of time all the video signals which are stored in the delay line may be accessed via the delay line tap points. By accessing such delay line at the tap points corresponding to a number of surrounding range cells 16 enveloping the range cell of interest 14 at a particular instant, the sum of the video signals produced by clutter surrounding the range cell of interest is derived. This sum video signal is divided by the number of tap points in averaging circuit 18 to derive the average or mean value of clutter 20 in the vicinity of the range cell of interest 14. This signal, which is proportional to the mean value of the clutter amplitude, is then combined, in combining circuit 22, with the signal at the center tap point of the delay line, which is defined to be the range cell of interest 14, so that a voltage corresponding to the ratio of the voltage at the center tap to the mean clutter video is formed. The ratio, which may be interpreted as instantaneous signal-to-clutter ratio 24, is then compared, in comparator 26, with a reference voltage 28, as produced by variable reference circuit 30. If the signal-to-clutter ratio 24 exceeds this reference voltage 28, a target is assumed to be present and an output video pulse signal is generated. Otherwise, no output is generated. The entire process just described is repeated at intervals corresponding to the reciprocal of the radar bandwidth, thus producing a detection sensitivity which varies in accordance with the amplitude of clutter in such a way as to produce a constant false alarm rate and a detection sensitivity which approaches the optimum value for that false alarm rate.

The reference voltage 28 against which the instantaneous signal-to-clutter ratio 24 is compared may also, if desired, be made adjustable by the operator to establish any convenient false alarm rate and define the signal-to-clutter ratio required for target detection. The variable reference circuit 30 is thus shown in FIGS. 1 and 2 merely to be a device that can produce a variable voltage against which another voltage, such as the signal-to-clutter ratio signal 24, may be compared. Obviously, this could include such simple devices as potentiometers and transistor voltage reference circuits. However, a more sophisticated and accurate means employing false alarm rate comparators and integrators could be used for the variable reference circuit 30. For example, the average false alarm value can be derived and utilized in a system false alarm rate comparator arrangement wherein the signal-to-clutter ratio would be compared periodically with a specified false alarm rate and the values that exceed the specified false alarm rate would then be integrated to obtain the mean average or value that exceeds said specified false alarm rate. This mean exceeding value would then be compared with the signal-to-clutter ratio in the usual manner as previously described. As a result, a more realistic evaluation of the signal environment is accomplished.

Figure 2:
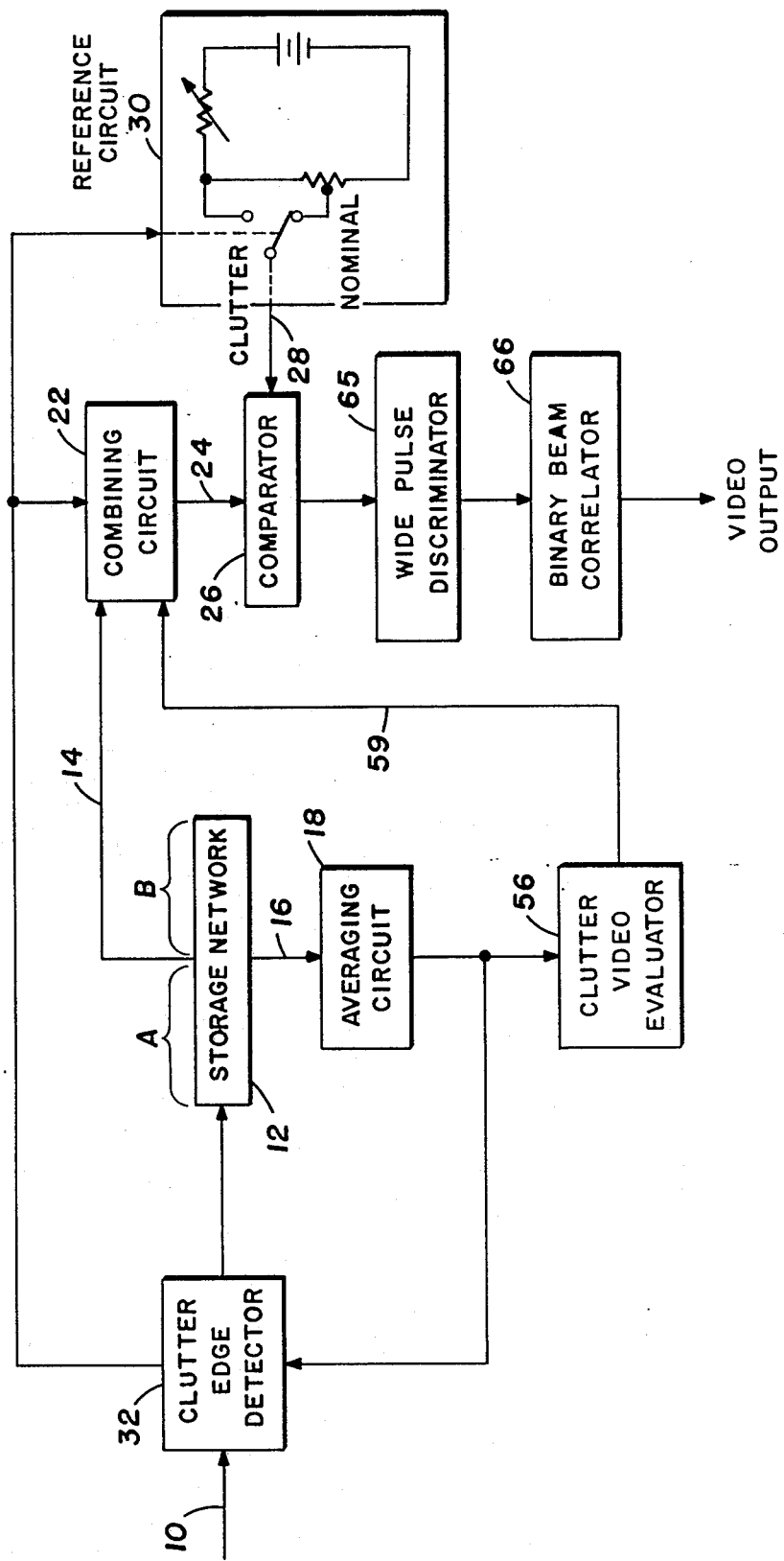
FIG. 2 is a block diagram which illustrates the basic processing system of FIG. 1 augmented with several additional processing techniques.

The basic processing system described above may be augmented with several additional processing techniques to enhance performance as depicted in FIGS. 2 and 3. More specifically, for near optimum detection sensitivity, approximately twenty range cells must be used to establish an estimate of the magnitude of the clutter, and it is necessary that the radar clutter which is used to derive the instantaneous signal-to-clutter ratio 24 be essentially uniform over the clutter averaging interval established by the averaging circuit 18 if optimum performance is to be achieved. If clutter edges are encountered, however, a discontinuity in the clutter characteristics will propagate through the averaging circuit 18, causing non-optimum performance during the transient time interval of approximately 20 radar pulse widths. In other words, during the first half of this transient interval, in the presence of a clutter edge, the average clutter level voltage derived from the averaging circuit 18 will be generally higher than desired and the instantaneous signal-to-clutter ratio voltage 24 will be below the desired value, resulting in reduced detection sensitivity for a given target video signal amplitude. On the other hand, during the second half of the transient interval, the average clutter level voltage derived from the averaging circuit 18 will be generally lower than desired, causing the instantaneous signal-to-clutter ratio voltage to be higher than desired and thus producing an undesired increase in detection sensitivity which creates an increased false alarm rate. In order to reduce these deleterious effects of clutter edges, the radar video may be applied to a clutter edge detector 32 prior to being fed to the video storage delay line constituting the storage network 12, as shown in FIG. 2. If an edge is detected, as will be described, the detector 32 alters the clutter video signal being combined, at 22, with the range cell of interest 14 such that it is always the best approximation to the real clutter magnitude and also controls the reference voltage ouput from the reference circuit 30, so as to shift from a nominal reference voltage to a preselected higher clutter reference voltage level. For example and as will be described in detail hereinafter in conjunction with FIG. 3, if an abrupt increase in the clutter level is encountered, the clutter edge detector 32 could be used to switch the source of the clutter video, applied to combining circuit 22, from all twenty range cells surrounding the range cell of interest 14 to the ten with the oldest video. An interval corresponding to ten times the reciprocal of the radar bandwidth (ten range cells) would transpire before the clutter edge affected these cells. After this time, logic circuitry within the detector 32 would switch the source of the clutter video to the newest video in the storage delay line. The clutter video derived from this section of the dealy line would have the proper value since the large amplitude clutter would have propagated through the ten cells. After an additional ten range cell interval, the logic which was initiated by the clutter edge detector would be used to employ the full twenty range cells to derive the clutter video signal. This same process would be repeated at the trailing edge of clutter, i.e., at an abrupt decrease in the clutter amplitude.

Referring to the detailed block diagram of FIG. 3, prior to delivering the radar video signal 10 to the storage network 12, it is first passed through the detector 32 which senses the presence of a clutter discontinuity, by comparing at comparator 40 the average clutter voltage amplitude in ($n$) cells ($n = 3$ in FIG. 3) derived from storage network 41 and averaging circuit 42 with that of the preceding ($n$) cells derived from storage network 43 and averaging circuit 44. If the average clutter amplitude from 41-42 is greater than that derived from 43-44 by a preselected constant (K) or is less than that derived from 43-44 by a constant (1/K), a clutter edge is declared to be present. More specifically, in the first case where the average derived from 41-42 is greater, a positive clutter edge is present and, conversely, a negative clutter edge is present if the average clutter derived from 43-44 is greater.

The detection of a clutter edge, regardless of polarity, causes comparator 40 to initiate the operation of the waveform generator 45 and the generation of the control voltage pulse signal as shown in FIG. 3. Using the time at which the clutter edge was detected as the reference time (T = O), this control voltage pulse will be initiated or go positive at T = $b$ (as shown); remain positive until T = $b$ + A; after which it becomes negative until T = $b$ + A + B, where, $b$ is the time at which storage network 43 becomes filled, A is the time needed to fill the first half (first 10 range cells) of the storage network 12, and B is the time needed to fill the second half (final 10 range cells) of storage network 12.

The voltage waveform generator 45 can be implemented in many ways. For example, one rather obvious implementation is to utilize successive one-shot delay circuits to establish the timing relationships $b$, A and B, an inverter circuit to account for the reversal in polarity, and a summing circuit to combine the pulse outputs from the one-shots which time out the A and B intervals.

The output pulse signal from generator 45 is applied to and controls an electronic analog switch 46, in order to select the source of the clutter video signal to be applied to the combining circuit 22 as described hereinabove; i.e., whether this clutter video signal should come from all twenty range cells which surround the range cell of interest (appearing on line 14) or only from ten range cells. More specifically, the positive control voltage pulse portion of the output from generator 45 actuates switch 46 to position labelled "B" wherein the average clutter voltage from the second half of the averaging interval, appearing on line 47 from the averaging circuit 18, is selected for application via line 48$a$ to the combining circuit 22; the negative control voltage pulse from generator 45 actuates switch 46 to its "A" position and thereby causes the first half of the averaging interval to be used, by connecting line 49 from the averaging circuit 18 to the combining circuit; whereas, in the absence of a clutter edge, the switch 46 maintained in its illustrated "A·B" position wherein the entire twenty cells surrounding the range cell of interest would serve as the source of clutter video. It should also be noted here that if either a positive or negative control voltage pulse is being used to select only half of the averaging interval, i.e., if a clutter edge has been detected, the reference circuit 30 is caused to produce an altered (e.g., somewhat higher) reference voltage 28 in order to maintain the desired false alarm rate, as represented by the control line 48$b$ in FIG. 3.

After passing through the clutter edge detector 32, the incoming radar video signal is applied to the storage network 12 which comprises, in series, two ten cell (each cell = $\tau$, the radar pulse width) storages or delays referred to as A and B above, and each of which consists of a seven cell delay network 50$a$, $b$ and a three cell delay network 51$a$, $b$. As noted hereinabove, the range cell of interest is derived between these ten cell A and B delay networks, at line 14, and is applied to the combining circuit 22 where it is used to produce the desired signal-to-clutter ratio signal. As shown in FIG. 3, an additional 1$\tau$ delay network can, if desired, be provided on each side of the center tap 14 of the storage network 12 in order to help assure that the target cell of interest does not itself contribute anything to the average clutter signals derived from the ten cell A and B delay segments of storage network 12.

As illustrated in FIG. 3, the average circuit 18 includes: a pair of seven cell averaging circuits 52$a$ and 52$b$ which are connected to and produce an output signal representing the average clutter within the 7$\tau$ delay networks 50$a$ and 50$b$ respectively; a pair of three cell averaging circuits 53$a$ and 53$b$ which produce an output signal representing the average clutter with the 3$\tau$ delay networks 51$a$ and 51$b$; a pair of ten cell average circuits 54$a$ and 54$b$ which are each connected to the outputs of a seven cell averaging circuit and the adjacent three cell averaging circuit and thus produce, on lines 49 and 47 respectively, the signals representative of the average clutter within the A and B time intervals as previously discussed. A 20 cell averaging circuit 55 is also provided and responds to the ten cell average signals on lines 47 and 49 in order to produce the twenty cell average clutter video signal. As previously described, depending upon whether or not a clutter edge is detected by detector 32, the outputs of averaging circuits 54$a$ and $b$ and 55 are selected, by switch 46, as the source of clutter video to be applied to the combining circuit 22.

As already discussed in relation to the clutter edge detector 32, the non-uniformity of clutter over the normal averaging interval (20$\tau$) reduces the performance of the proposed adaptive video processor. In order to compensate for this, a clutter video evaluator designated at 56 in FIG. 2 is used to sense the non-uniformity of the clutter over the averaging interval and causes the averaging circuit 18 to derive an average clutter level voltage from the cells closest to the center tap 14 of the averaging circuit 18, thus reducing the averaging interval. More specifically, as shown in FIG. 3, this is done by deriving a six cell average clutter level voltage, at averaging circuit 57, and comparing it with the normal twenty cell average clutter level voltage, derived at 55, by means of a "greatest of" selection or comparator circuit 58. Thus, if the six cell average is greater than the twenty cell average, the six cell average is used to derive the instantaenous signal-to-clutter voltage in the combining circuit 22, as represented by control line 59. Otherwise, the normal twenty cell average clutter level voltage is used.

Figure 4:
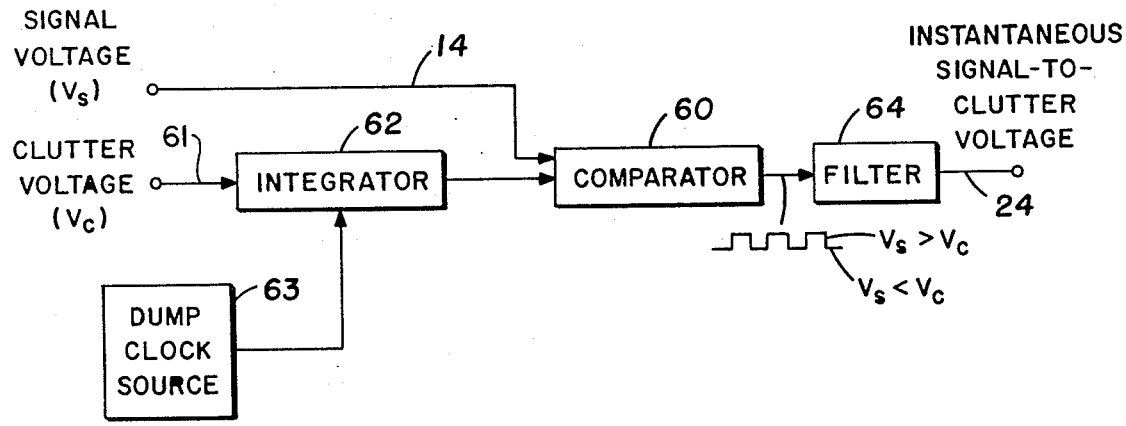
FIG. 4 is a block diagram illustrating an example of how the combining circuit of FIGS. 1 and 2 might be implemented.

Referring now to FIG. 4 and the details of one possible embodiment of the combining circuit 22, the range cell of interest signal appearing on 14 is applied as one input to a comparator circuit 60. The other input to comparator 60 is a sawtooth signal derived by applying the selected clutter voltage, on line 61, to an integrator 62 which is periodically dumped or reset at a rate equal to 1/$\tau$ by a signal from source 63. As a result, the comparator 60 produces an output pulse train, the duty cycle (ratio of on time to off time) of which is derived from the combination of the signal and clutter voltages appearing at 14 and 61 respectively; e.g., for as long as the signal on line 14 exceeds a sawtooth output of integrator 62, comparator 60 will generate an output pulse of corresponding width. This pulse train output from comparator 60 is then filtered at 64 to form the instantaneous signal-to-clutter ratio voltage, shown at line 24 in FIGS. 1, 2 and 3.

As previously discussed, the signal-to-clutter signal 24 is then applied to comparator 26 for comparison against the selected reference voltage signal output 28 from circuit 30, and the output of the signal-to-clutter vs reference voltage comparator 26 is a video pulse whose width is equivalent to the length of time that the required signal-to-clutter ratio is exceeded. As interfering pulse such as that produced by another radar might produce undesired false alarms. A wide pulse discriminator 65 can, if desired, be provided at the ouput of the comparator 26 therefore, as shown in FIG. 2, to inhibit all signals whose duration is longer than that which would be produced by targets of interest. A shift register could be utilized to accomplish this purpose.

Figure 5:
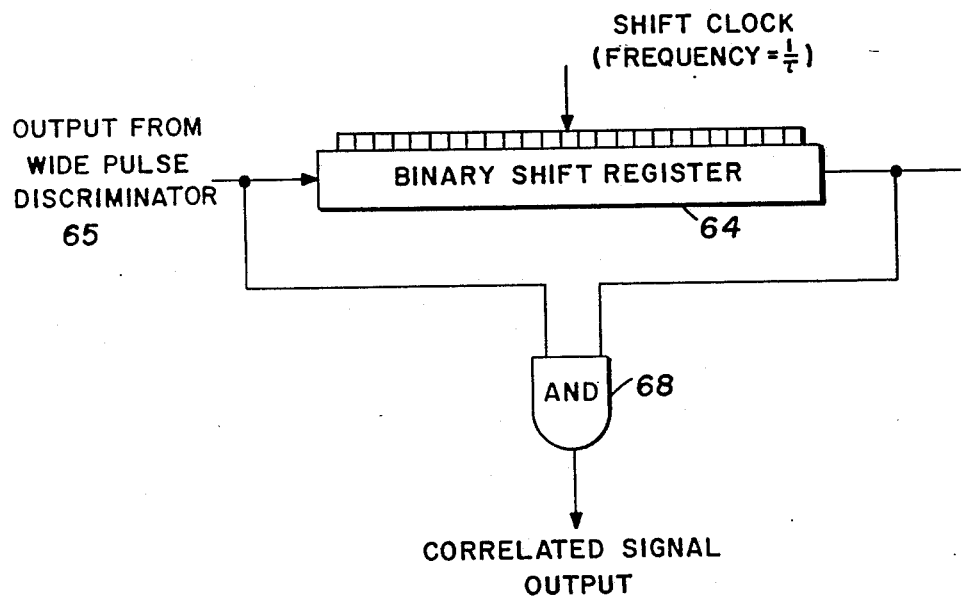
FIG. 5 is a block diagram illustrating an example of how the binary correlator of FIG. 2 might be implemented.

As added protection against interfering signals which are not longer than the radar range cell, a binary correlator 66 may be used to store the output of the signal-to-clutter vs reference voltage comparator 26 for one radar transmission and use the stored data to compare with that derived from the subsequent transmission. As illustrated in FIG. 5, a binary shift register 67 having a storage length equal to the reciprocal of the radar pulse repetition frequency (PRF) and a shift clock frequency of $1/\tau$, in combination with an AND gate 68, could be utilized to function as such a correlator. More specifically, only if the same target detections are made on successive radar transmissions, will an output signal be produced by the AND gate 68. Otherwise, no output is generated. This technique is useful in application where the radar antenna position is moved less than a beamwidth between transmissions. Of course, in this situation the reference voltage applied to Of course, in this situation the reference voltage applied to the comparator 26 would be reduced to increase sensitivity (and false alarms) so that the system false alarm rate (at the output of the correlator) is constant.

Various other modifications, adaptations and alterations are of course possible in light of the above teachings. Therefore, it should be understood at this time that within the scope of the appended claims the invention may be practiced otherwise than as specifically described.

What is claimed is:
1. An adaptive radar video processor for segregating clutter from target signals in radar returns composed of a plurality of range cells, said video processor comprising:
   means for storing periodically updated video signals corresponding to each range cell in said radar returns,
   a first means for gaining access to the stored video signal corresponding to a particular range cell of interest, said range cell of interest being defined as the center tap cell,
   a second means for gaining access to the stored video signals corresponding to a plurality of range cells that surround said center tap cell,
   averaging means for producing from the average value of said video signals corresponding to said surrounding range cells an average value signal representing the mean value of clutter amplitude in the vicinity of said center tap cell,
   means for combining said center tap video signal with said signal representing said mean clutter value to produce an output signal corresponding to the instantaneous signal-to-clutter ratio,
   a source of adjustable reference voltage, the amplitude of said reference voltage providing a false alarm threshold corresponding to a desired minimum signal-to-clutter ratio, and
   means for comparing the output signal from said combining means with said reference voltage.

2. The video processor as claimed in claim 1 wherein said storage means comprises a video delay line.

3. The video processor as specified in claim 1 wherein
   said averaging means is effective to produce a first average value signal representing the mean clutter value for a preselected number of range cells encompassing said center tap cell in range and storage time, and second and third average value signals representing the mean clutter values for a lesser preselected number of range cells prior to and after said center tap cell respectively in range and storage time, and further including
   clutter edge detection means operably connecting said averaging means to said combining means for selectively applying said first, second and third average value signals to said combining means,
   said first average value signal being applied to said combining means in the absence of a clutter edge,
   said second average value signal being applied to said combining means for a first time interval corresponding to said lesser preselected number of range cells upon detection of a clutter edge by said detection means,
   said third average value signal being applied to said combining means for a second time interval corresponding to said lesser preselected number of range cells at the termination of said first time interval following the detection of a clutter edge,
   said first average value signal being again applied to said combining means at the termination of said second time interval following the detection of a clutter edge.

4. The video processor specified in claim 3 wherein said preselected number of range cells encompassing said center tap cell is equal to twenty range cells and said lesser preselected number of range cells both prior to and after said center tap cell in range and storage time is equal to ten range cells.

5. The video processor specified in claim 1 wherein said averaging means produces first and second average value signals representing respectively the mean values of clutter within a first and second plurality of range cells each encompassing said center tap cell,
   said second plurality of range cells containing less range cells on each side of said center tap cell than said first plurality of range cells, and further including,
   clutter evaluator means operably connected to said averaging means and said combining means and responsive to said first and second average value signals for selectively applying whichever of said first and second average value signals represents a larger mean clutter value to said combining means.

6. The video processor specified in claim 3 wherein said averaging means also produces a fourth average value signal representing the mean clutter value within a fourth plurality of range cells encompassing said center tap cell, said fourth plurality of range cells containing less range cells on each side of said center tap cell than said first plurality of range cells, and further including clutter evaluator means operably connected to said averaging means and said combining means and responsive to said first and fourth average value signals for selectively applying whichever of said first and fourth average value signals represents a larger mean clutter value to said combining means.

7. The video processor specified in claim 1 wherein said comparing means produces an output video signal pulse having a pulse width indicative of the length of time that said instantaneous signal-to-clutter ratio exceeds said desired minimum ratio, and further including means operably connected to receive the output video signal pulse from said comparing means for discriminating against output video signal pulses whose width is longer than a preselcted value that would be produced by targets of interest.

8. The video processor specified in claim 5 wherein said comparing means produces an output video signal pulse having a pulse width indicative of the length of time that said instantaneous signal-to-clutter ratio exceeds said desired minimum ratio, and further including means operably connected to receive the output video signal pulse from said comparing means for discriminating against output video signal pulses whose width is longer than a preselected value that would be produced by targets of interest.

9. The video processor specified in claim 1 further including correlating means operably connected to receive the output video signal pulse from said comparing means for producing an output signal indicating target presence only if there is correlation between the target signals contained in the radar returns resulting from successive radar transmissions.

10. The video processor specified in claim 8 further including correlating means operably connected to receive the output video signal pulse from said comparing means for producing an output signal indicating target presence only if there is correlation between the target signals contained in the radar returns resulting from successive radar transmissions.

11. The video processor specified in claim 9 wherein said correlating means is a shift register having a storage length equal to the reciprocal of the radar pulse repetition frequency and a serial shift clocking frequency equal to the reciprocal of the radar pulse width.

12. The video processor specified in claim 1 further including means effective to prevent said center tap signal from contributing to said mean clutter value signal.

13. The video processor specified in claim 3 further including means effective to prevent said center tap signal from contributing to said mean clutter value signal.

14. The video processor specified in claim 13 wherein said prevention means comprises first and second storage means for storing a range cell on each side of said center tap cell between said center tap cell and each of said lesser preselected number of range cells prior to and after said center tap cell.

* * * * *